United States Patent [19]
Hsieh

[11] Patent Number: 5,270,629
[45] Date of Patent: Dec. 14, 1993

[54] AUTOMATIC VERTICAL BLIND CONTROLLER WITH MEMORY

[75] Inventor: Chi-Sheng Hsieh, 3F, No. 65, Fukwo Rd., Shih Lin District, Taipei, Taiwan

[73] Assignees: Casper Shih; Chi-Sheng Hsieh, Taiwan

[21] Appl. No.: 876,402

[22] Filed: Apr. 30, 1992

[51] Int. Cl.$^5$ .................... H04Q 9/02; H02P 1/22
[52] U.S. Cl. ............................ 318/600; 318/16; 318/459; 318/480; 160/331; 160/DIG. 17
[58] Field of Search ............... 318/256–283, 318/466–468, 560–630, 16; 160/5, 167, 166.1, 168.1, 170, 174, 176.1, 178.2, 331, 323; 49/139

[56] References Cited

U.S. PATENT DOCUMENTS

| | | | |
|---|---|---|---|
| 4,417,185 | 11/1983 | Bullat | 318/466 |
| 4,618,804 | 10/1986 | Iwasaki | 318/16 |
| 4,653,377 | 3/1987 | Chen | 84/94 C |
| 4,706,726 | 11/1987 | Nortoft | 160/168 R |
| 4,819,708 | 4/1989 | Onosato et al. | 160/331 |
| 4,902,953 | 2/1990 | Kraft et al. | 318/663 |
| 4,914,360 | 4/1990 | Hsieh et al. | 318/16 |
| 4,926,922 | 5/1990 | Shimazaki | 160/331 |
| 4,951,730 | 8/1990 | Hsu | 160/5 |
| 4,956,588 | 9/1990 | Ming | 318/16 |
| 4,979,550 | 12/1990 | Long et al. | 160/5 |
| 5,038,087 | 8/1991 | Archer et al. | 318/469 |

Primary Examiner—Paul Ip
Attorney, Agent, or Firm—Bacon & Thomas

[57] ABSTRACT

An automatic vertical blind controller with memory, particularly an automatic vertical blind controller with automatic/manual operated memory for control of vertical blind turning and movement automatically by referring to a reference data in the memory representing the upper limit degree of turning/movement set up by its user, comprising an outer casing, an inner casing and a control circuit board, in which the control circuit board is composed of an infrared receiver circuit, a manual operated push button control circuit, a single-chip microprocessor, two relay motor driving circuits, a music control circuit, and a power supply; the inner casing is incorporated with two d.c. motors each incorporated with a reducing gear, two light sensor within it, and a chain pulley, a cord pulley, two light detectors, two guide wheels, and two press wheels outside the inner casing except the two light detectors are located below the chain pulley and the cord pulley within the inner casing; the control circuit board is located at the rear part of the inner casing; the outer casing is incorporated with five push buttons and has a size just for fitting of the inner casing.

4 Claims, 9 Drawing Sheets

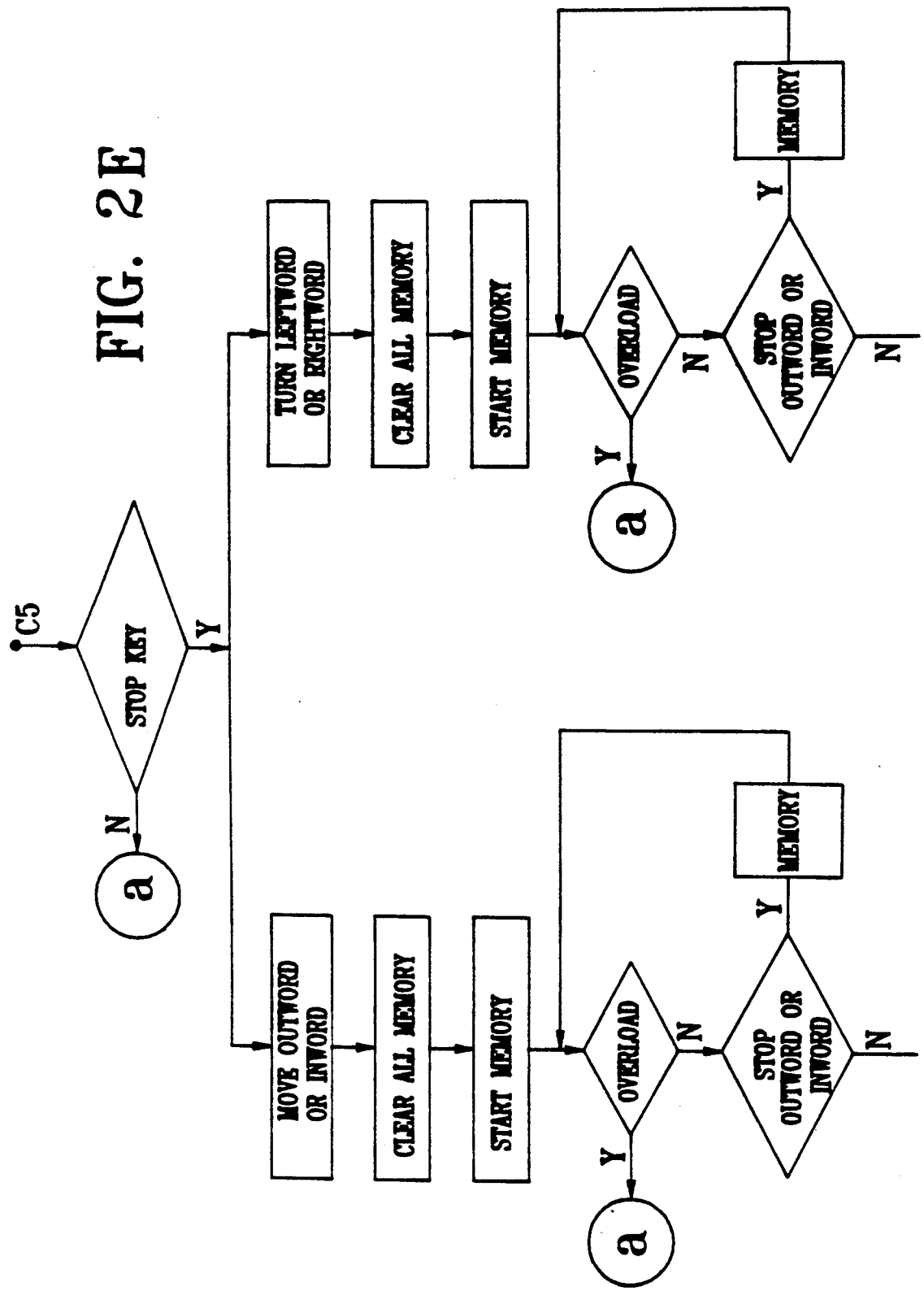

# AUTOMATIC VERTICAL BLIND CONTROLLER WITH MEMORY

BACKGROUND OF THE INVENTION

The present invention relates to an automatic vertical blind controller with memory.

Vertical blinds have been widely used in home and office for easily adjusting indoor lighting from an outdoor lighting source. However, the conventional vertical blind, such as the manual/automatic vertical blind controller disclosed in the U.S. Pat. No. 4,956,588, has a lot of defects, as follows:

1. As shown in FIG. 5, a circuit diagram for an infrared receiver circuit disclosed in the above U.S. patent R5 and R6 are semi-adjustable carbon resistors for adjusting base voltage, and R1 and R2 are resistors for picking up overload signals from driving circuit ICs 53 and 54 in order to provide a voltage to a motor overload detection circuit (60). However, because R5 and R6 are adjustable, it is necessary to adjust their sensitivity in every use, which is not convenient, and the adjustment may therefore be inaccurate.

2. The driving circuit ICs 53 and 54 normally can withstand a current of about 1.5 Amp, but the d.c. motor (M1 or M2) may continue to run after the vertical blind reaches the end, and hence, overload will occur, which results in a increasing of current to the ICs 53 and 54, and consequently burning out of the ICs 53 and 54, or even fire.

3. The rail of the vertical blind will may become oxidized and will accumulated dust after prolonged use, resulting in larger friction on the rail, and consequently the load becomes greater. Taking this load into consideration, the maximum length of vertical blind applicable is usually about 2 to 3 meters. Hence, the prior art is not practical.

SUMMARY OF THE INVENTION

In view of the above defects, the inventor has created an automatic vertical blind controller with a memory to eliminate such defects. It is a practical and advanced device, particularly in the form is an automatic vertical blind controller with an automatic/manually operated memory for control of vertical blind turning and movement automatically by referring to reference data in the memory representing the upper limit degree of turning-/movement set up by its user, comprising an outer casing, an inner casing and a control circuit board, in which the control circuit board is composed of an infrared receiver circuit, a manual operated push button control circuit, a single-chip microprocessor, two relay motor driving circuits, a music control circuit, and a power supply. The inner casing includes two d.c. motors each having a reducing gear, two rotation sensors, and a chain pulley, a cord pulley, two light detectors, two guide wheels, and two press wheels outside the inner casing. The two light detectors are located below the chain pulley and the cord pulley within the inner casing; the control circuit board is located at the rear part of the inner casing; and the outer casing is incorporated with five push buttons and has a size just large enough to accommodate the inner casing.

BRIEF DESCRIPTION OF THE DRAWINGS

The above summarized objects and features of the invention will become more apparent from the following description taken in connection with the accompanying drawings wherein:

FIGS. 2D-2E is a flow chart for the manual memory function of the single-chip microprocessor according to the present invention;

DETAILED DESCRIPTION OF THE PREFERRED EMBODIMENT

Figure 1:
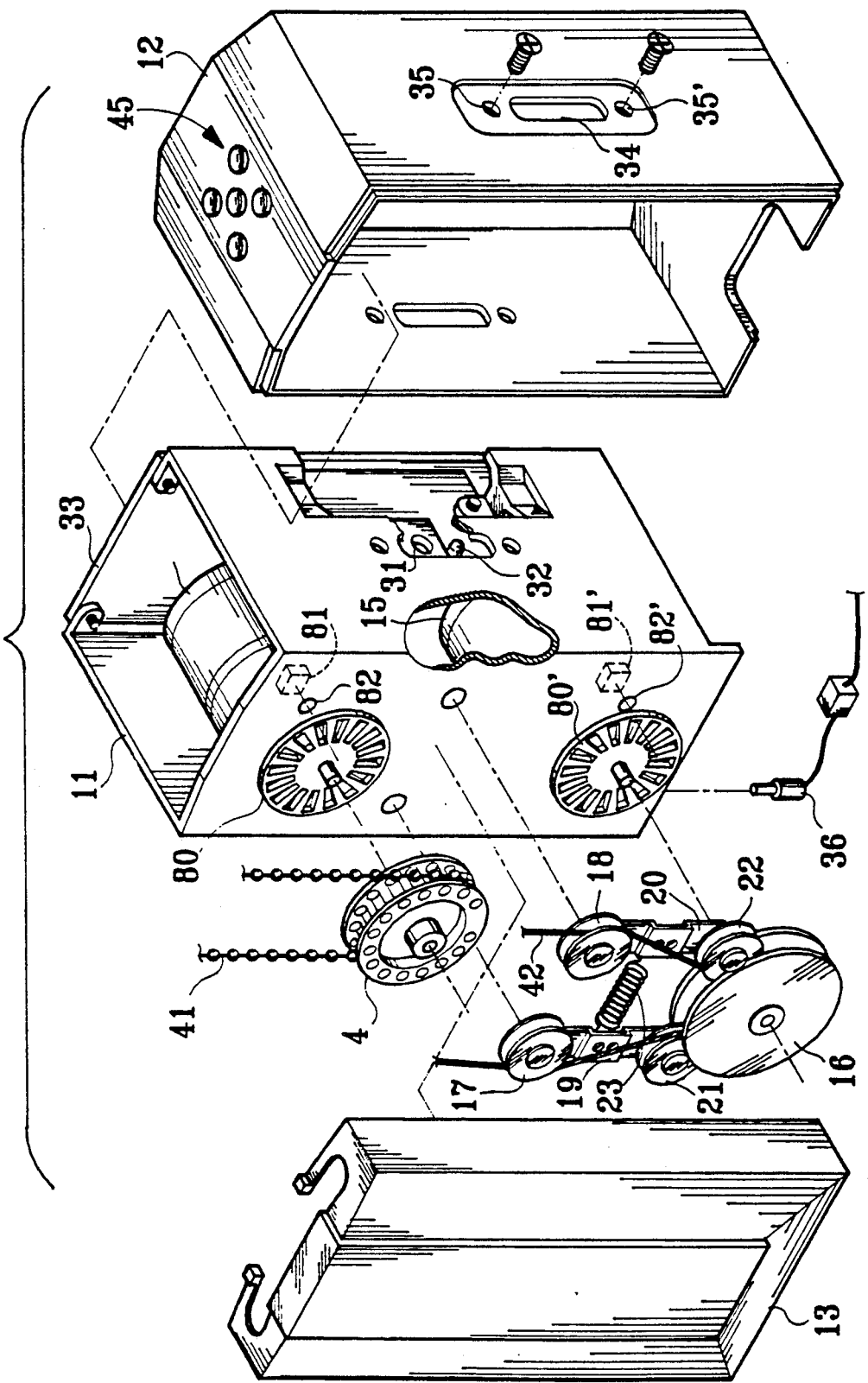
FIG. 1 is a perspective and exploded view of an automatic vertical blind controller with memory according to the present invention.
Figure 3:
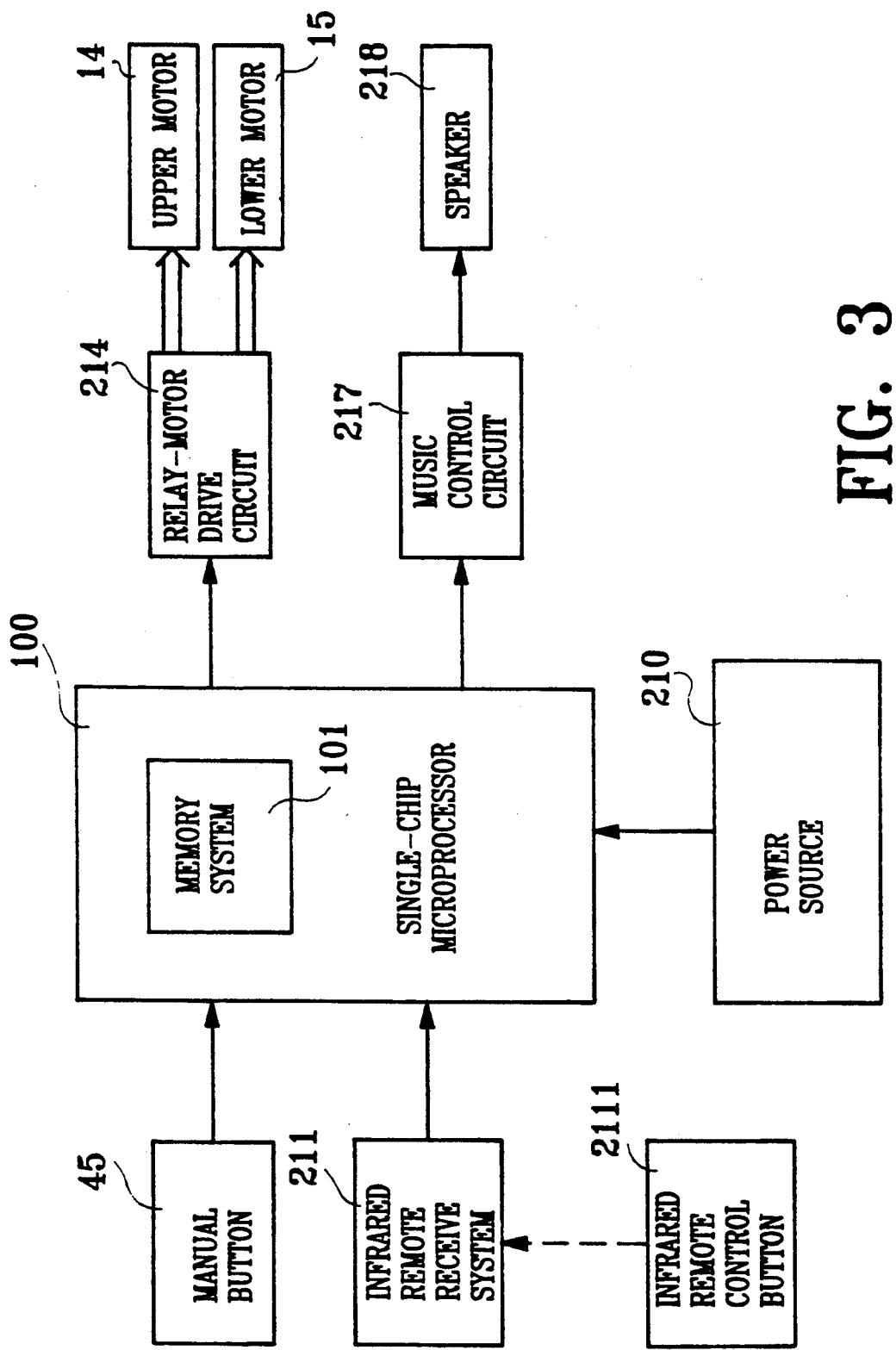
FIG. 3 is a block diagram for the function of the control circuit board according to the present invention.

As shown in FIG. 1, a perspective and exploded view of an automatic vertical blind controller with memory according to the present invention, the controller is composed of an inner casing (11), an outer casing (12) and a control circuit board (33). The inner casing (11) has two holes for installation of two d.c. motors (14 and 15). The upper d.c. motor (14) is incorporated with a chain pulley (4), and the lower d.c. motor (15) is incorporated with a cord pulley (16). There is a circular rotation sensor (80) beneath the chain pulley (4), and another circular light sensor (80') beneath the cord pulley (16). Two pulleys (17 and 18) each connected to an end of a rectangular plate (19 or 20) are located at appropriate positions. A spring (23) is installed between the two rectangular plates (19 and 20) so as to pull two press wheels (21 and 22) inwards in order to maintain the press wheels (21 and 22) within the groove of the cord pulley (16), and to compress the cord pulley (16) directly so that a cord (42) of any diameter can be placed and maintained therein tensely. The inner casing (11)) has two small holes (82 and 82') beneath the light sensors (80 and 80'). A light detector (81 or 81') is installed to detect a light sensing clock signal transmitted by the light sensors (82 and 80') through the small holes (82 and 82') upon rotation of the chain pulley (4) and the cord puller (16). These clock signals are received by the light detectors (81 and 81'), converted into electrical clock signals thereby, and then transmitted to a single-chip microprocessor (100) on the control circuit board (33) for processing (as shown in FIG. 3). An infrared receiver (31) is used to receive signals from a remote infrared transmitter. The outer casing (12) includes five push buttons for manual setting of the memory or control in case the remote infrared transmitter is missing. The outer casing (12) has dimensioned to just fit for fitting on the inner casing, and has a display opening (34) and two screw holes (35 and 35') for securing the outer casing to the inner casing (11) with two bolts. A power source socket (36) is provide for connecting to power source.

Figure 2A:
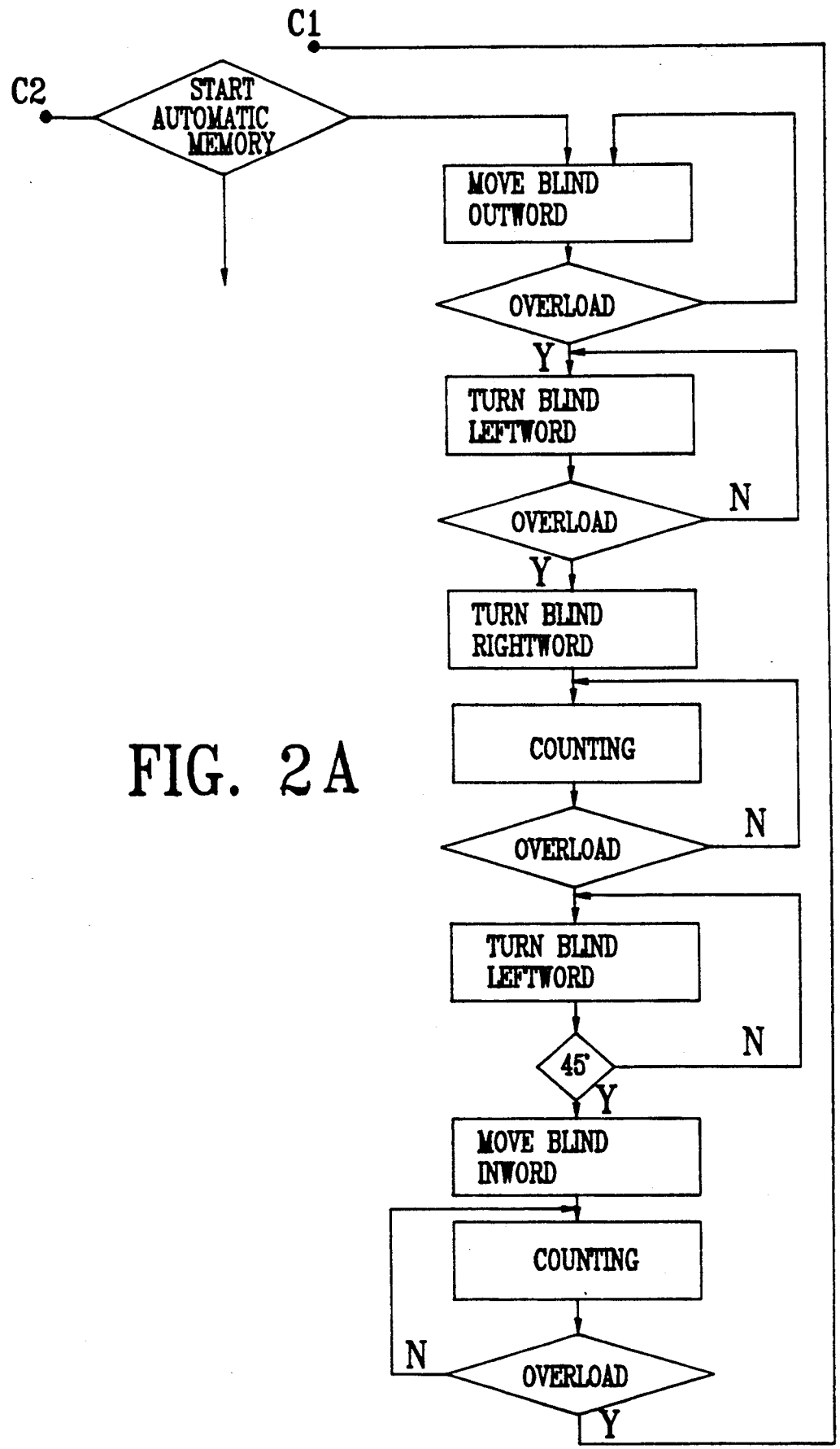
FIGS. 2A-2C is a flow chart for the automatic memory function of a single-chip microprocessor according to the present invention.
Figure 2B:
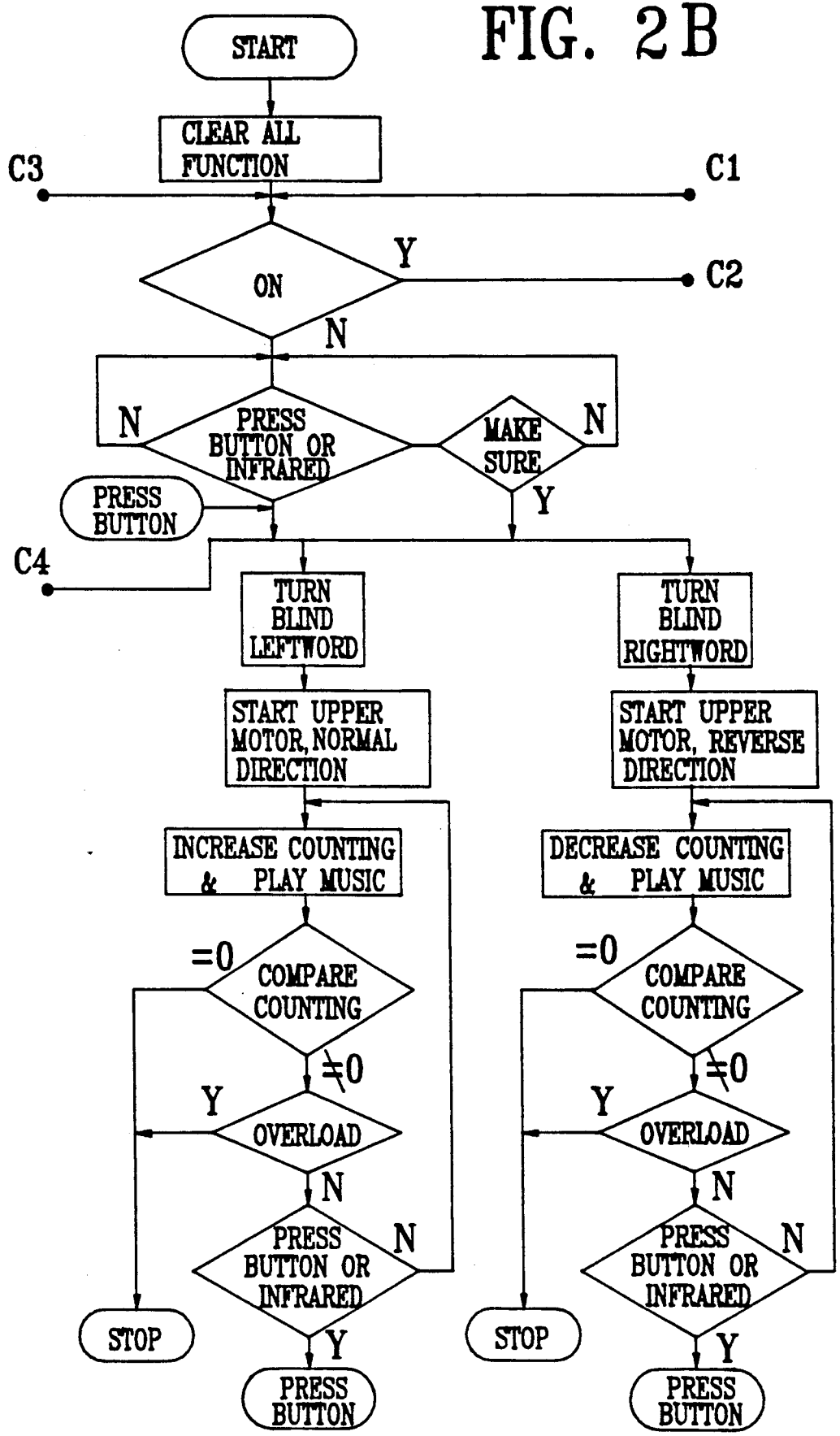
Figure 2C:
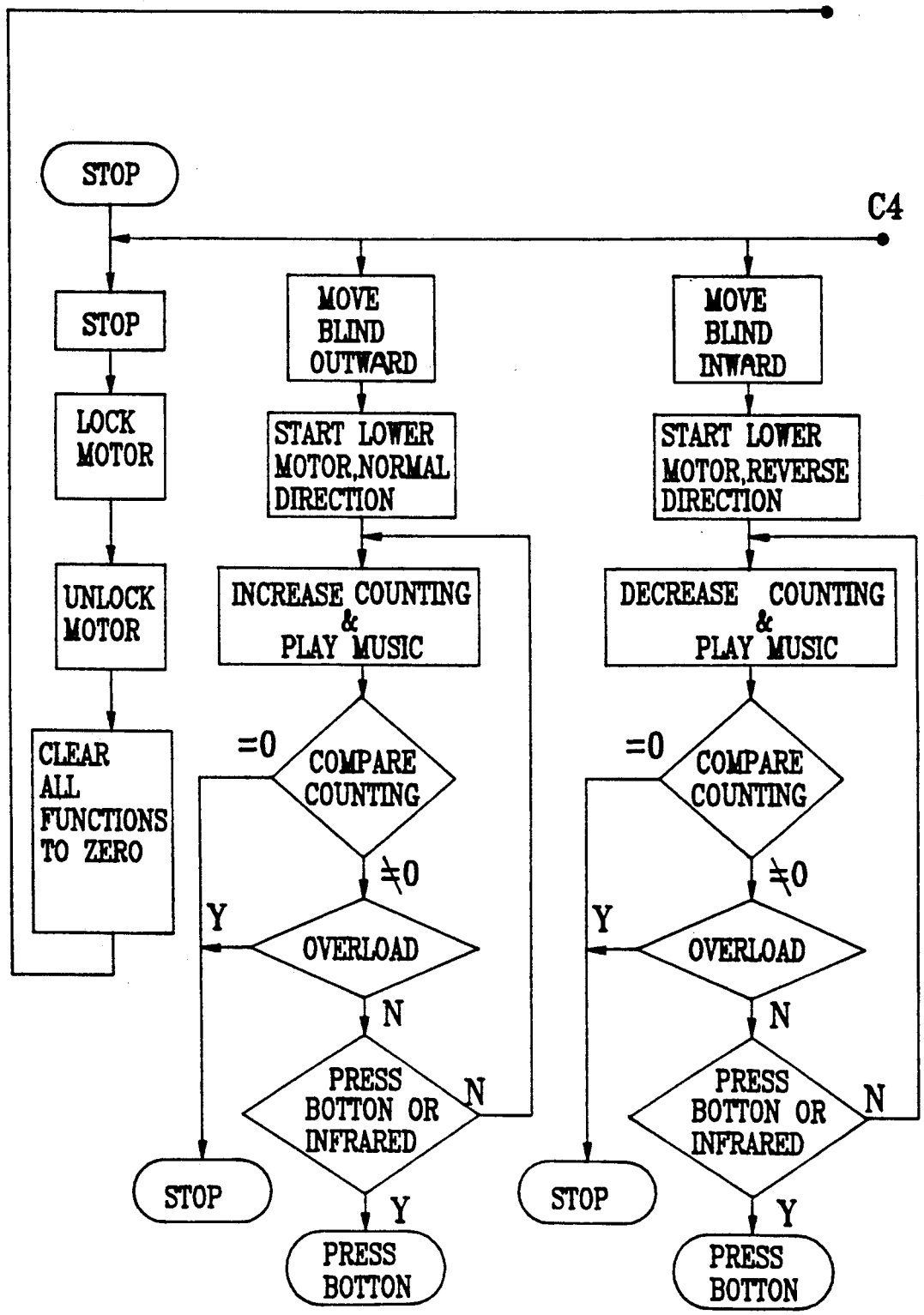
Figure 2D:
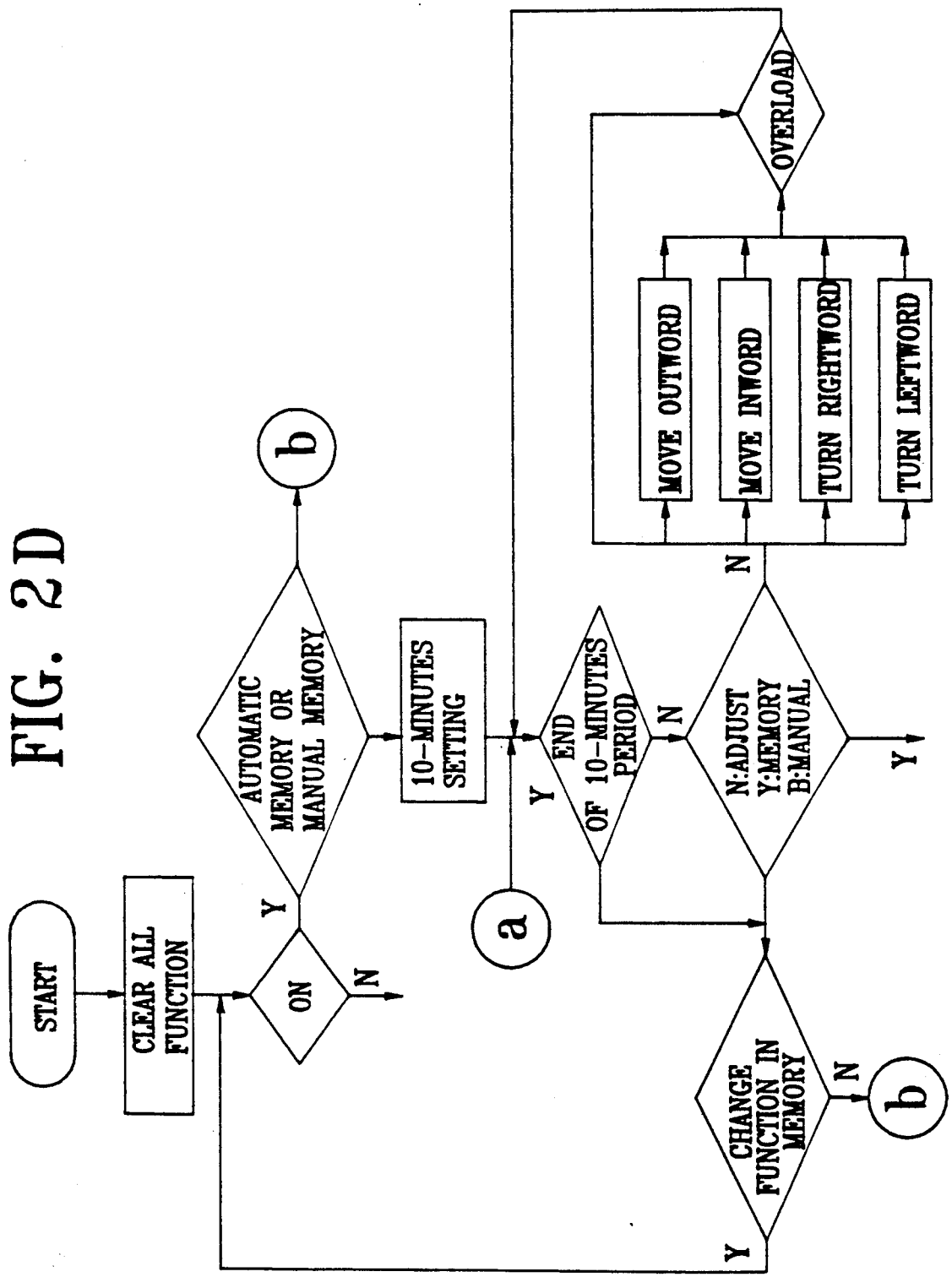

FIG. 2A, is a flow chart illustrating the automatic function control of the preferred automatic blind controller by a single-chip micro-processor. As shown in the figure, upon operation of each vertical blind controller with memory according to the present invention, in order to avoid an overload which occurs frequently in the conventional vertical blind controller, the controller enters an automatic memory mode automatically if its STOP key is not pressed within 3-4 seconds after it is turned on or reset after power failure. In this mode, the vertical blind is moved outwards continuously till overload occurs. At this moment, no point of overload is stored in the memory. Then, the vertical blind proceeds to turn leftwards till overload occurs. This process resets the memory. The vertical blind is then turned rightwards. At this moment, the memory system (101) in the single-chip micro-processor (100) begins to save the degree of turning till overload occurs, and the point where the overload occurs is saved in the memory system (10) as a reference to stop turning of the vertical blind in future operations. The vertical blind is then turned leftward and the single-chip micro-processor sets the vertical blind to turn leftward for 45° to assure smooth moving of the vertical blind. Then, the vertical blind begins to move backwards, a counter begins counting till overload occurs, which means that the vertical blind has reached the beginning position, and such position is a reference for start or stop of the vertical blind, and is saved in the memory system (101) for comparison in further operations of the vertical blind. Alternatively, but also upon first operation of the present invention, if the STOP key is pressed within 3-4 seconds after it is turned on, the system enters manual mode automatically. Please refer to FIG. 2B for a flow chart for manual control of memory functions. Upon starting of the single-chip micro-processor, a period of 10 minutes is set for manual operation. If the manual memory system is not activated within this 10-minute period, the micro-processor (100) activates the automatic memory system (as described above). Upon manual operation, the push buttons (45) are used. As shown in the flow chart, there are three adjustment modes: N for movement control, Y for activation of manual memory control, and B for disabling manual memory control. The N mode is for control of the vertical blind with push buttons (45) manually, upon which the single-chip micro-processor (100) will not operate with the memory. To activate Y mode, an adjustment key (out, in, left or right) and the STOP key are pressed simultaneously, the single-chip microprocessor (100) erases the memory and causes the memory system (101) to start memorizing. By pressing the STOP key when the vertical blind reaches the desired position, the stop point is saved in the memory system (101) as a basis for further operation. After setting up the stop points, the manual memory control can be disabled by B mode, that is, by pressing the STOP keys for five times consecutively, upon which the micro-processor disables the manual memory control. Upon disabling of the manual memory control, the memory is checked. If no data is saved in the memory, the automatic memory is activated. If there is data in the memory, the controller enters a standby state to avoid overload in the automatic memory mode when the controller is turned on.

Upon receipt of a remote infrared signal or signal from any of the push buttons, the single-chip micro-processor (100) can distinguish the signal, and cause the blind to perform the action required. For instance, if the signal is to move the vertical blind outwards, the lower motor (15) is caused to run in normal direction, the single-chip micro-processor (100) starts counting, play a music, and compare the counting with the reference data saved in the vertical blind. Movement of the vertical blind continues till the counting is equal to the reference data, but the movement can be interrupted at any time in the course of moving by pressing of the STOP button. For backward moving of the vertical blind, the lower motor (15) is caused to run in reverse direction, and the counting is in reverse order. For leftward turning of the vertical blind, the upper motor (14) is caused to run in normal direction and the counting is in normal order. For rightward turning of the vertical blind, the upper motor (14) is caused to run in reverse direction, and the counting is in reverse order.

Though overload occurs in the automatic memory mode, it happens only at start-up, and the overload is for the purpose of setting up an overload point, which is applied as a reference for all operations thereafter. No further overload will occur. Therefore, in comparison with the conventional vertical blind controller, far fewer overloads will occur, and consequently the service life of the vertical blind can be prolonged.

Figure 4:
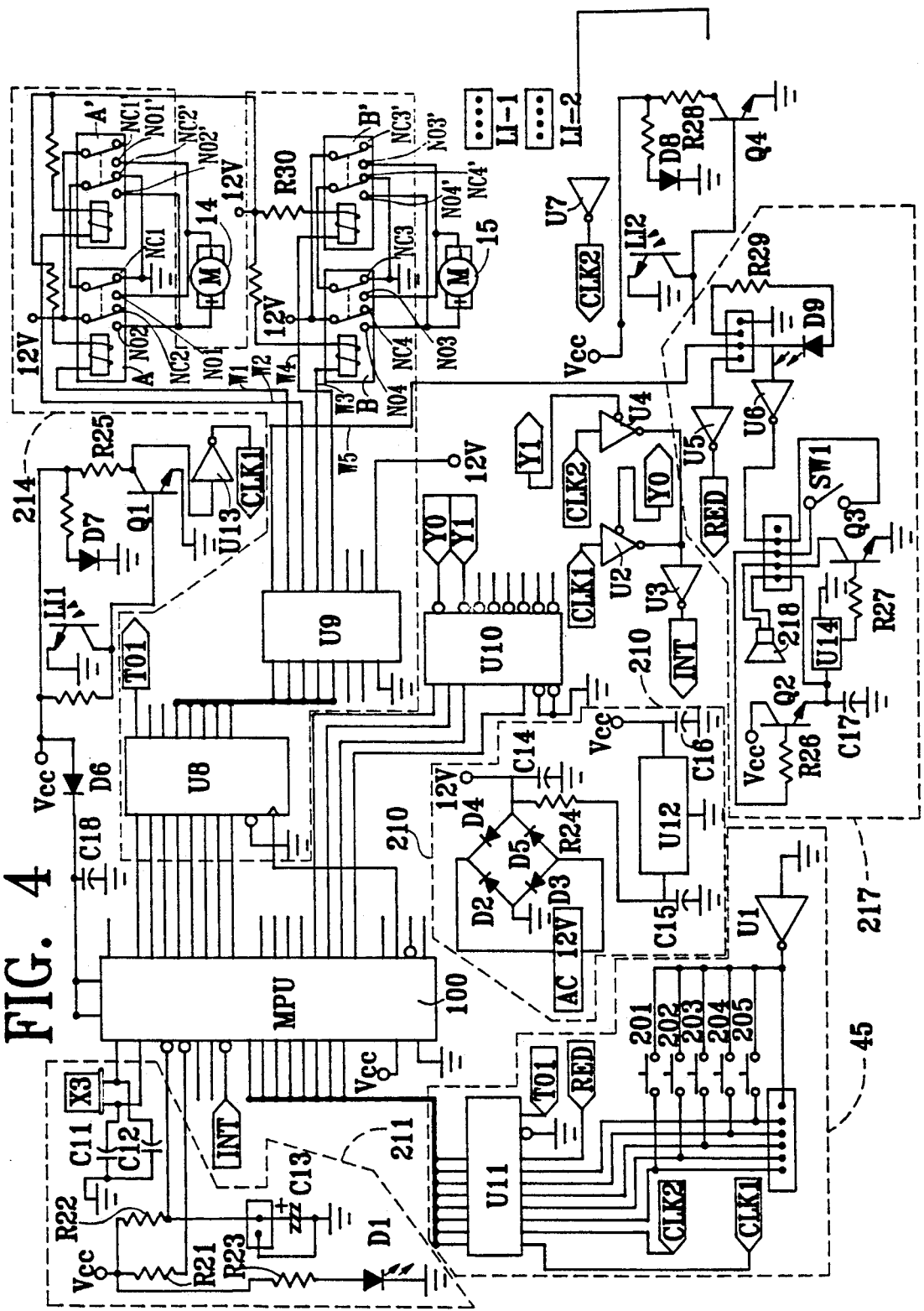
FIG. 4 is a circuit diagram for the control circuit board according to the present invention.
Figure 5:
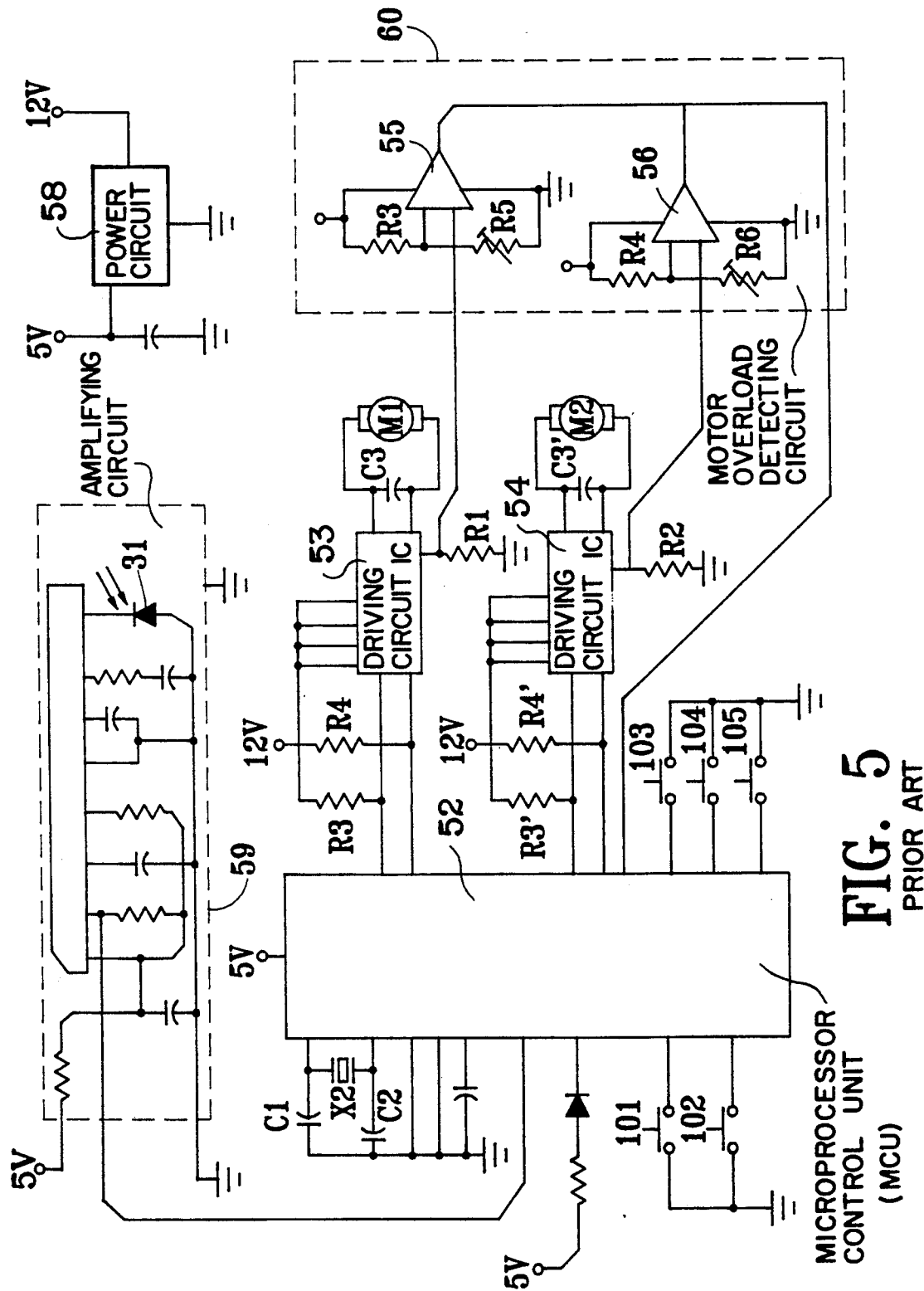
FIG. 5 is an infrared control circuit diagram for the prior art as disclosed in the U.S. Pat. No. 4,956,588.

Please refer to FIG. 3 for a block diagram of the control circuit for the present invention. When the power source system (210) is ON, and any of the push buttons (45) on the outer casing (12) or any button (2111) on the remote infrared controller is pressed, the cord pulley (16) or the chain pulley (4) is activated to rotate, the two rotation sensors (80 and 80') detect rotation of the pulleys (16 and 4), a clock signal is generated by light detectors 81 and 81'. This clock signal is transmitted to the single-chip microprocessor (100) in the control circuit board (33) for saving or determination of the source of setting. Upon receipt of such signal, the microprocessor (100) orders the vertical blind to operate, and starts the motors (14 and 15). At the same time, the microprocessor (100) instructs a music control circuit (217) to play music via a speaker (218), and the single-chip microprocessor (100) begins to set the memory system to accumulate counting, and compare the counting with the reference set and check if it exceeds the reference data. If it does not exceed the reference data, pushing of the STOP button can stop the vertical blind, and then further pushing of the button (45) on the button (2111) on the infrared remote controller can cause the vertical blind to continue its operation till the reference data is reached. Then, the microprocessor (100) sends a stop signal to a relay motor driving circuit (214) to stop the motors (14 and 15) without occurrence of an overload problem. FIG. 4 is a circuit diagram for the control circuit according to the present invention. Referring to FIGS. 1, 3, and 4, the control circuit includes a single chip microprocessor (100), an infrared remote infrared receiver system (211), push buttons (45) on the outer casing, two relay motor driving circuits (214), two d.c. motors (14 and 15) the two light detectors (81 and 81') which include phototransistors Ll1 and Ll2, and a music control circuit (217). The manually operated push buttons (201-205) send signals to the microprocessor (100). The angle control push button (201) controls the rightward turning angle of vertical blind, another angle control push button (202) controls the leftward turning angle of the vertical blind, the close control push button (203) moves the vertical blind inwards, the open control push button (204) moves the vertical blind outwards, and the stop push button stops motor operation. As shown in the drawings, the relay motor driving circuit (214) causes the upper d.c. motor (14) to control leftward and rightward turning of the vertical blind, and the lower d.c. motor (15) to control inward and outward moving of the vertical blind. After receipt of the signal from the single-chip microprocessor (100), ICs U8 and U9 in the relay motor driving circuit (214) cause the signal on wire W2 to become low, and the other signal wires W2, W3 and W4 to become high in order to activate a relay A, which causes the contacts to jump to NO1 and NO2, while all other relays A', B and B' remain inactive and their contacts are at NC1', NC2', NC3, NC4, NC3' and NC4' respectively. When the relay A is activated, the upper d.c. motor (14) is driven to run in normal direction so that the blades of the vertical blind are turned leftwards. Similarly, when W3 is Low, and W1, W2 and W4 are high, the relay B is activated, the contacts jump to NO3 and NO4, the lower d.c. motor (15) is driven to run in normal direction so that the vertical blind is moved outwards, and a signal wire W5 send a signal to the music control circuit (217) to play music, and cause a transistor Q2 to activate a music IC U14 to provide audible music from a speaker (218). In this way, when the vertical blind is moving, there is music. The music stops as soon as either motor stops. When the relay A' is activated, the upper d.c. motor (14) is driven to run in a reverse direction so that the blades of the vertical blind are turned rightwards. When the relay B' is activated, the lower d.c. motor (15) is driven for to run in reverse direction to turn the vertical blind inwards. The use of relays to control motor running direction is much superior to the conventional electronic circuit which drives to motor directly. L1-1 and LI-2 receive clock signals from the light detectors (81 and 81'). The light detectors (81 and 81') detect light passing though two holes (82 and 82') when the cord pulley (16) and the chain pulley (4) are rotated. Consequently, the light is detected by the light detectors (81 and 81') to generate a clock signal which is then received by LI-1 or LI-2 on the clock signal control circuit (261) of the control circuit board (33), and is then transmitted to the microprocessor (100) as a reference for the relay motor driving circuit for further driving of the motors (14 and 15). Moreover, with the memory system in the single-chip microprocessor (100), there is no limit on length of vertical blind, and the motor will not continue operation after occurrence of overload. Therefore, the present invention is a novel and practical device for control of vertical blind.

As described above, the present invention provides a practical and advanced controller for vertical blind. It has two rotation sensors to detect a position according to rotation of a cord pulley and chain pulley for disposition in a memory of a single-chip microprocessor in order to control motor operation, and to prevent overload except during operation for the first time when the overload position is unknown. Moreover, relays are used to drive motors to prevent overcurrents like those which occurs in the conventional electronic driving circuit. The preferred controller impose any limit on the length of vertical blind to eliminate the need for modifying control circuit upon change of length as required in the prior art, which would otherwise result in overloads if the control circuit remains unchanged. The present invention uses light sensors to detect clock signals for control of vertical blind movement, there is no limit on length of vertical blind, and hence the present invention is applicable to vertical blind of any length. In addition to the above features, operation of the vertical blind is accompanied by music in order to provide a nice music when adjusting the vertical blind for appropriate lighting purpose.

Many changes and modification in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. In an automatic vertical blind controller having a memory and including an inner casing having two sets of DC motors, one of which includes means for driving a chain pulley and the other of which includes means for driving a cord pulley, the improvement comprising:
    a control circuit which includes a microprocessor having a memory for storing reference data representing an overload position of said motor;
    means for detecting positions of said pulleys based on rotation thereof;
    means for activating said pulleys to rotate,
    wherein said control circuit includes means for, upon initial activation of said pulleys, operating said motors until overload positions are reached, and storing said overload positions as reference data in said memories, and means for, upon subsequent activation of said pulleys, comparing movement of said pulleys with the stored reference data in order to control the degree of turning, opening and closing of the vertical blind without overload.

2. A blind as claimed in claim 1, wherein said means for activating the pulleys includes means for selectively receiving signals from an infrared remote control and from a pushbutton provided on an outer casing.

3. A controller as claimed in claim 1, wherein said means for activating said pulleys includes relays, whereby said motors are operated by opening and closing said relays in response to results of said comparison.

4. A controller as claimed in claim 2, further comprising means for playing music upon activation of said motors, and for stopping said music when said motors are stopped.

* * * * *